Oct. 4, 1960 R. C. STRAWN 2,954,856
TORQUE RESPONSIVE CLUTCH
Filed April 18, 1952

INVENTOR.
Raymond C. Strawn
BY Robert H. Wendt
Att'y

United States Patent Office

2,954,856
Patented Oct. 4, 1960

2,954,856

TORQUE RESPONSIVE CLUTCH

Raymond C. Strawn, 438 W. 98th Place, Chicago, Ill.

Filed Apr. 18, 1952, Ser. No. 282,936

1 Claim. (Cl. 192—54)

The present invention relates to a modifying coupling or torque responsive clutch wherein the frictional grip between the clutch faces is increased with an increase of torsional strain on a driven shaft.

It is accordingly an object of the present invention to provide for an improved modifying coupling or torque responsive clutch which is simple, efficient, and which provides for easy control and release of the operating parts.

Another object of the invention is to provide a device which may be economically manufactured and used for long periods of time without the necessity for repair or replacement of any its parts.

Another object of the invention is to provide a device as described which may be powered from either side selectively.

Another object of the invention is to provide a method of power transmission by means which are radially displaced from the main axis of the system and which pivotally connect the driving and driven members while affording release thereof as required.

Another object of the invention is to provide a device as described which is not impaired in its operation by temperature changes or the possible presence of foreign matter or the like.

Another object of the invention is to provide a device as described which obviates breakage and failure of the operative parts thereof.

Another object of the invention is to provide a power transmission system having an intermediate bearing axis which prevents leverage stress or shock from being applied to the main shaft of the system.

Another object of the invention is to provide a device as described which may be selectively operated from either end and which is adapted to transmit power around the main axis of the system.

Other objects and advantages of the invention will be apparent from the following description and accompanying drawings in which similar characters of reference indicate similar parts throughout the several views.

Referring now to the drawings, Figure 1 is an embodiment of the invention utilizing two friction disks with the parts thereof shown in the driving position;

Figure 1:
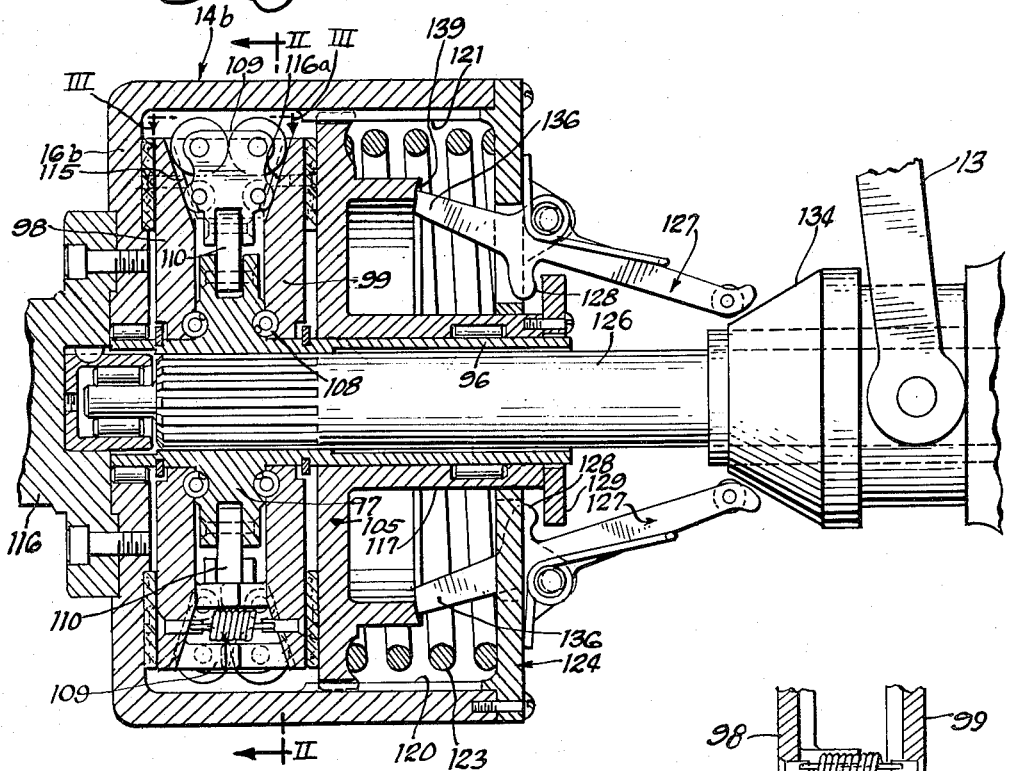
Figure 2:
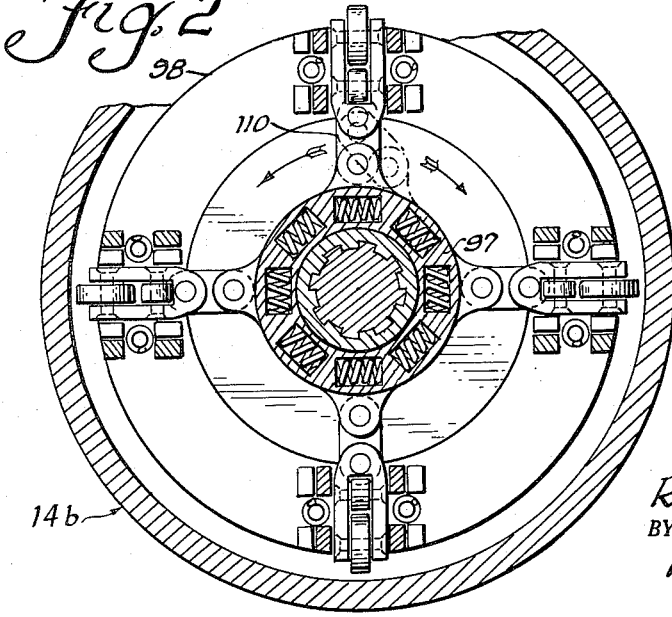
Figure 2 is a sectional view taken along lines II—II of Figure 1.
Figure 3:
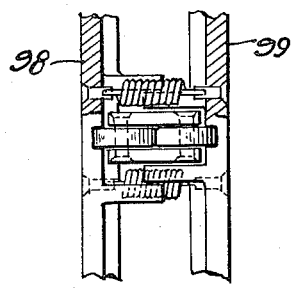
Figure 3 is a fragmentary sectional view taken along lines III—III of Figure 1.

Referring now to Figure 1, the operation of the device is as follows. The drive of the device is through shaft 116 and housing 14b which is bolted thereto. Pressure plate 105 is axially slidable relative to said housing and is splined thereto at 120, 121. The pressure plate 105 is spring-biased toward the drive shaft 116 by means of compression spring 123. The compression spring 123 is mounted between said pressure plate 105 and the end cover 124 of the housing. The driven shaft 126 is journaled for rotation concentrically of said housing and said pressure plate and is axially aligned with said drive shaft 116. Head 97 is splined on the end of the driven shaft intermediate buttress 16b of the housing and said pressure plate. Friction plates 98, 99 are mounted in spaced relation to each other on head 97 for a limited rotary oscillatory movement with respect to said head. Radial grooves 115, 116a on the opposed faces of said friction plates provide track means for guiding the radial movement for modifying means (roller carriages) 109, each of which is in turn pivotally connected to said head by means of links 110. Springs 108 are mounted between friction plates 98, 99 and head 97 to limit the oscillation of said plates with respect to said head and to return the plates to their normal position after being displaced. In the operation of the device the drive comes in through shaft 116, housing 14b, pressure plate 105, plates 98, 99, head 97 and driven shaft 12b. Upon the application of an excessive load on a driven shaft, the drive shaft and the housing will tend to overrun the driven shaft. In so doing, plates 98, 99 which are frictionally connected to the housing will rotate with respect to the head. Since the modifying means (roller carriages) 109 are constrained to oscillate with plates 98, 99, said means will also rotate with respect to head 97. Due to the linkage 110 between means 109 and head 97, such oscillatory movement will cause the link 110 to draw the means 109 radially inward thereby spreading plates 98, 99 and increasing the frictional drive connection between said plates and the housing to overcome the added torque load. The device will work the same if there is a sudden speedup of the drive member with respect to the driven member.

Lever 127 is pivotally mounted on a cover plate 124 of housing 14b. In the normal operation of the device, the lever is positioned as illustrated in Figure 1, the end 136 of lever 127 bearing against the spider 139 (outwardly extending flange on a pressure plate 105) to prevent the pressure plate 105 from moving out of contact with friction plate 99. Upon shifting lever 13, cone 134 will move the lever 127 out of engagement with the spider 139. Simultaneously, arm 128 of pivoted lever 127 will bear against abutment 129 bolted to the sleeve 117 of the pressure plate 105 thereby withdrawing said plate from operational contact with the friction plate to interrupt the drive completely.

Although I have herein set forth and described my invention with respect to certain specific principles and details thereof, it will be understood by those skilled in the art that these may be varied without departing from the spirit and scope of the invention as set forth in the hereunto appended claim.

Having thus described my invention, what I claim as new and desire to secure by Letters Patent of the United States, is:

In an energy transfer system, a driving member, a driven member, a housing with coupling means and spaced apart drive surface means, an oscillatory member pivoted centrally of said housing and provided with leverage means and coupling means, shiftable plate means extending radially and connected between said spaced apart drive surface means on said housing and to said oscillatory member and adapted to pivot relative to the center of the system, said shifting being to the right and left of said leverage means on said oscillatory member and parallel to the axis of the system, a buffer means resiliently latching said plate means to said oscillatory member and limiting its range of oscillation and affording a location within said range for said leverage means, said buffer means thus providing means for oscillatory movement of said leverage means in said range by directional demand, said shiftable plate means having plates having telescopic connecting means connecting said shiftable plate means in non-rotative relationship to each other and permitting said shiftable plate means to move apart and return under tension, and a modifying system mounted on said shiftable plate means including coupling means to said leverage means, driving means, driven means and means interchangeably connecting said driving means or said driven means to said coupling means for said housing or said coupling means for said leverage means.

References Cited in the file of this patent

UNITED STATES PATENTS

| | | |
|---|---|---|
| 936,190 | Tuckfield | Oct. 5, 1909 |
| 1,632,539 | Chilton | June 14, 1927 |
| 1,714,748 | Wright | May 28, 1929 |
| 1,834,259 | Singleton | Dec. 1, 1931 |
| 1,969,698 | Lyman | Aug. 7, 1934 |
| 1,987,833 | Lansing | Jan. 15, 1935 |
| 1,999,340 | Morley | Apr. 30, 1935 |
| 2,151,724 | Wengel et al. | Mar. 28, 1939 |
| 2,308,681 | Eason | Jan. 19, 1943 |

FOREIGN PATENTS

| | | |
|---|---|---|
| 660,180 | Germany | Apr. 21, 1938 |